Aug. 26, 1958   D. C. LINCOLN   2,849,325
STABILIZED CELLULOSE ETHER COMPOSITION
Filed June 28, 1952   4 Sheets-Sheet 2
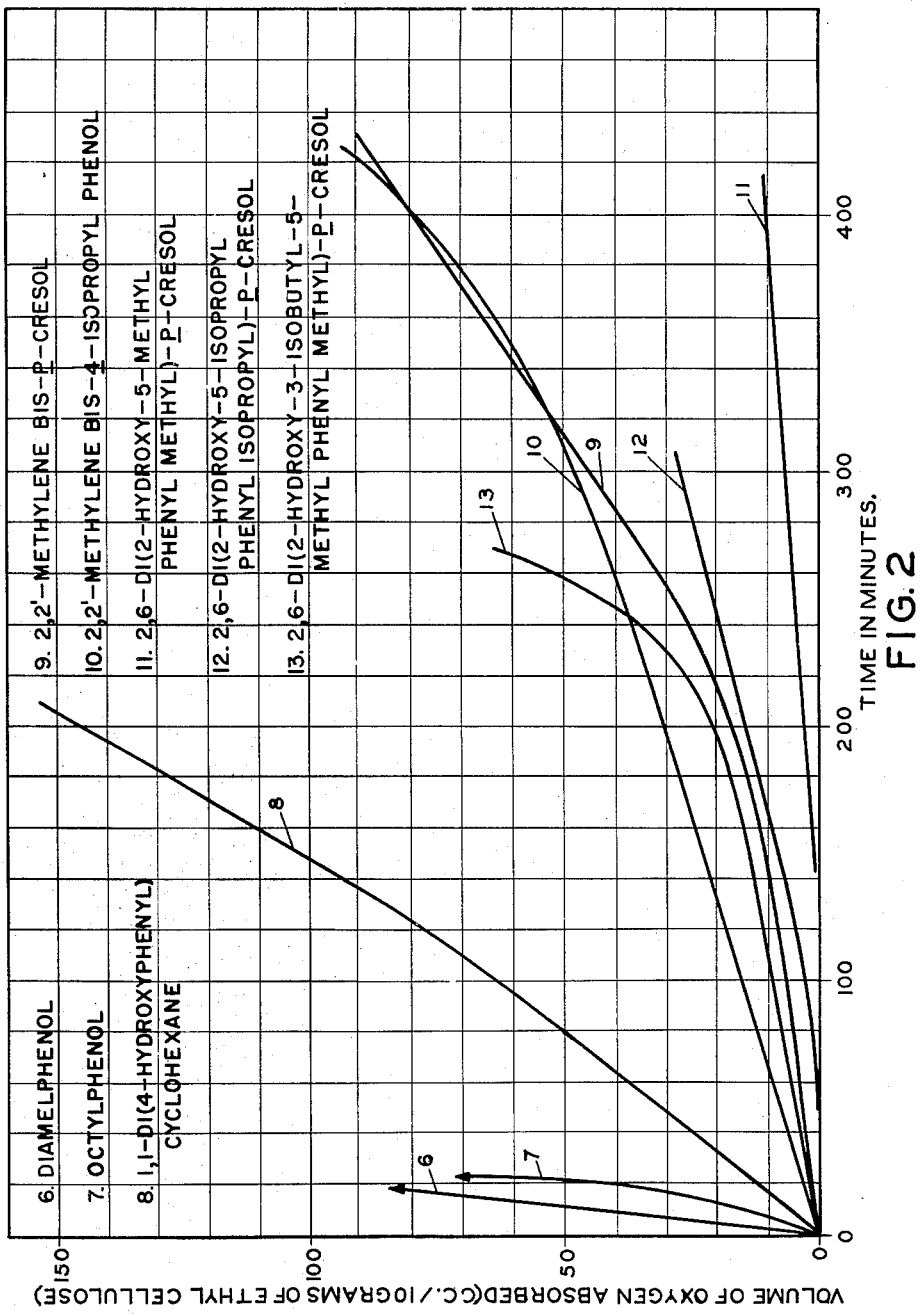
DWIGHT C. LINCOLN.
INVENTOR.
BY Ernest G. Peterson
AGENT.

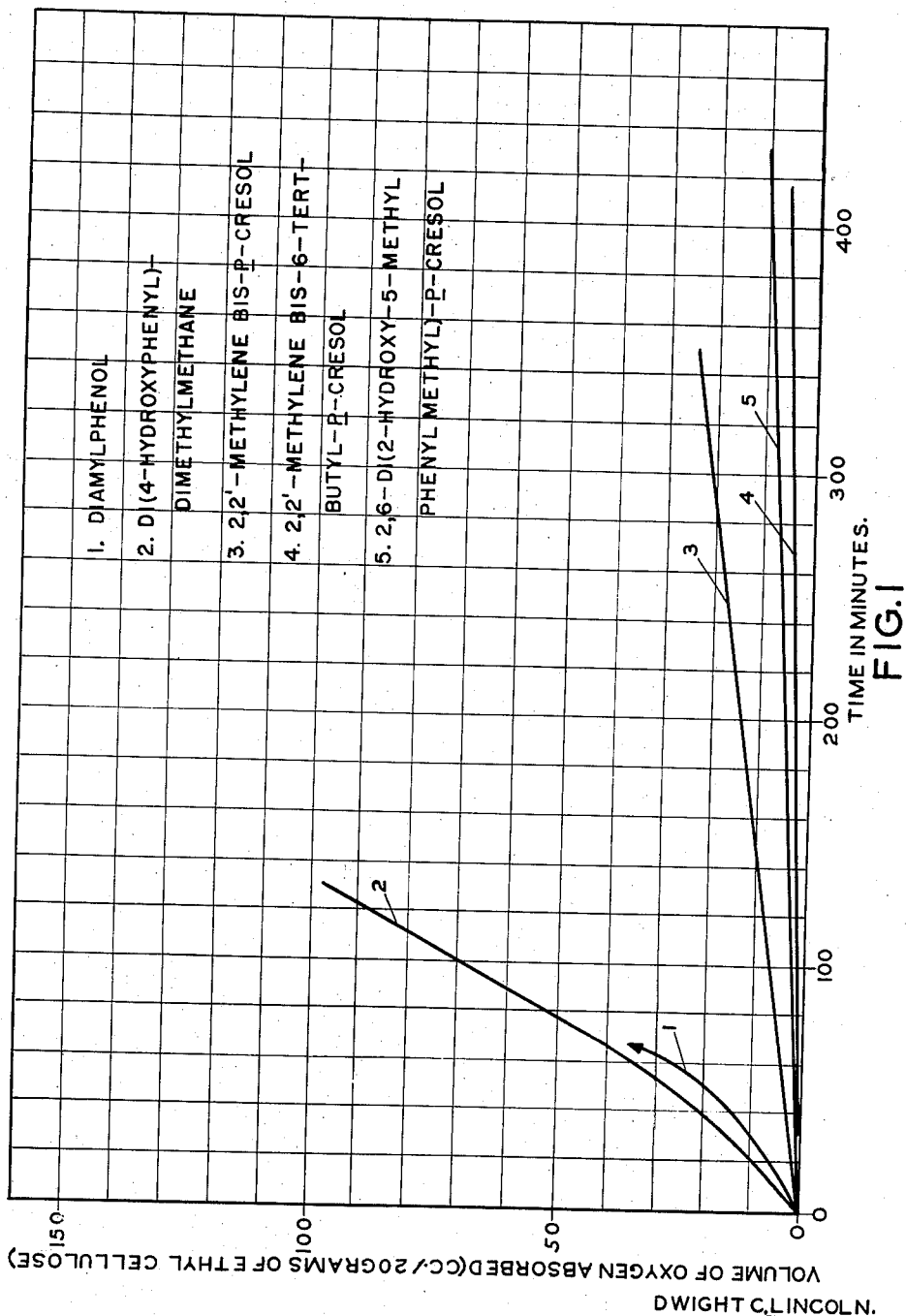

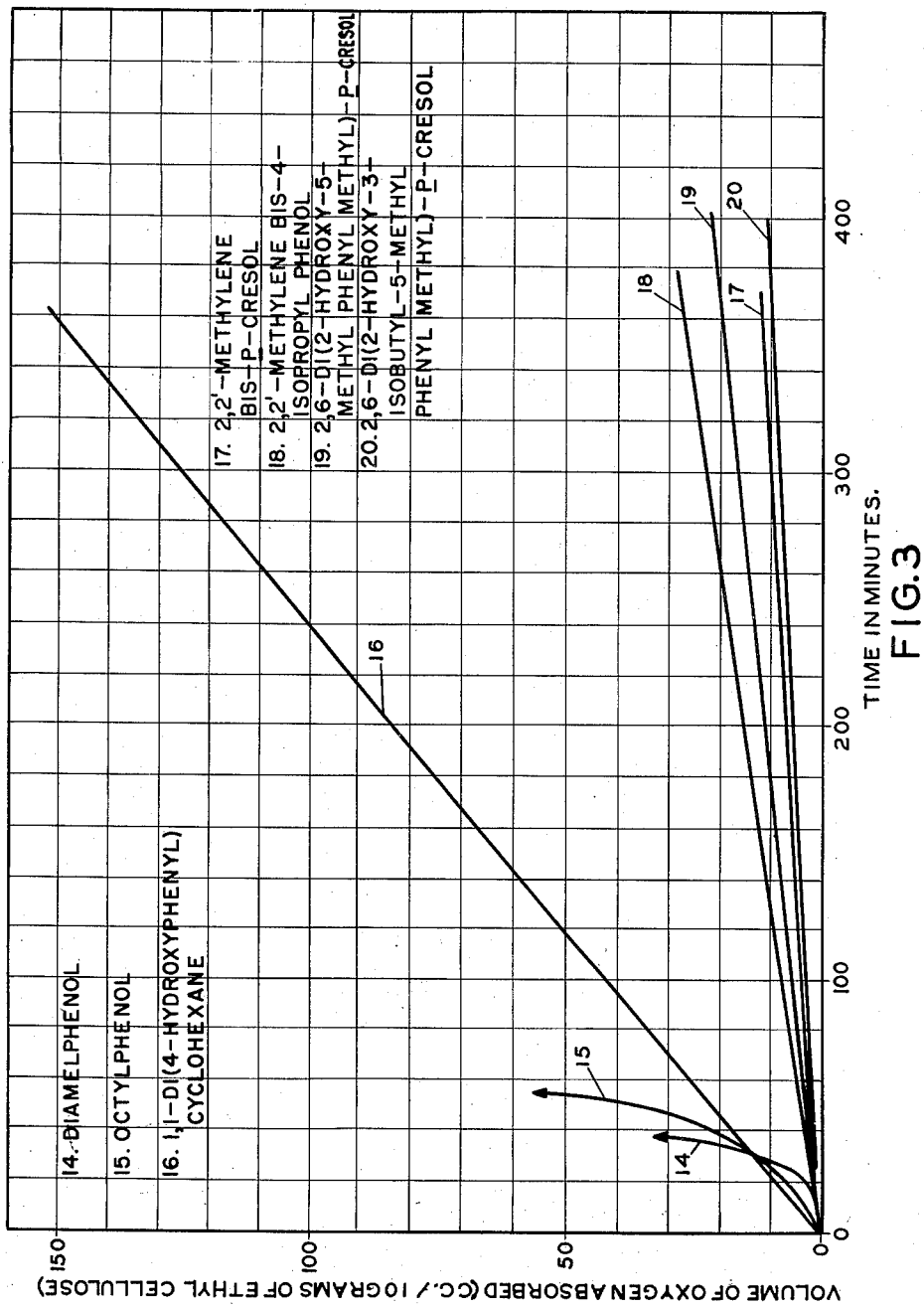

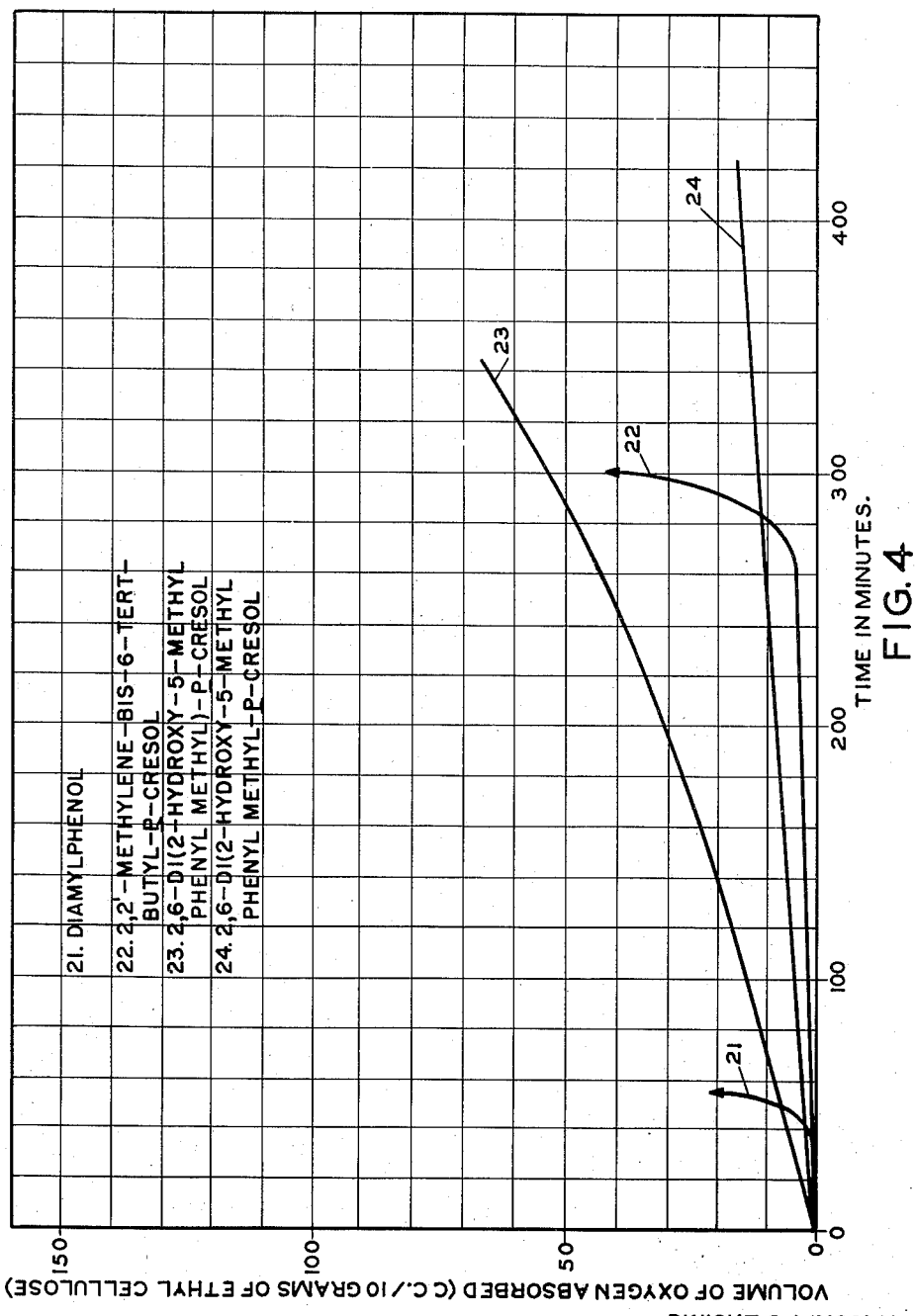

United States Patent Office 2,849,325
Patented Aug. 26, 1958

2,849,325

STABILIZED CELLULOSE ETHER COMPOSITION

Dwight C. Lincoln, Kennett Square, Pa., assignor to Hercules Powder Company, Wilmington, Del., a corporation of Delaware Application June 28, 1952, Serial No. 296,150

8 Claims. (Cl. 106—189)

This invention relates to the stabilization of cellulose ethers. In a specific aspect this invention relates to the production of stabilized ethyl cellulose and to ethyl cellulose compositions that retain their viscosity and color during and after exposure to heat, light, oxidation, weathering and other degrading influences.

Cellulose ether compositions and particularly ethyl cellulose compositions have found considerable usefulness where the properties of toughness, dimensional stability and flexibility at extremely low temperatures are desirable. However, when subjected to elevated temperatures, prolonged exposure to ultraviolet light or aging in general, there has been a discoloration and/or viscosity degradation which has limited their usefulness to a considerable extent. Thus, compositions depositing a colorless mass from solution have given relatively dark amber masses much like tortoise shell upon being molded at temperatures of the order of 200°–300° C. In addition, there has been considerable loss of viscosity, i. e., degradation, leading to brittle molded products. Similar discoloration and loss of viscosity, strength, and flexibility also result from prolonged storage or exposure to ultraviolet light and weathering. The problem of stabilization is particularly difficult where relatively high heats are required, as in fast molding, or when the material is exposed for prolonged periods to severe weathering conditions. The problem of stabilization is even more difficult when a deashed ethyl cellulose is employed. The oxidative degradation of ethyl cellulose is autocatalytic and acid catalyzed, even by acid groups as weak as the carboxyls attached to the ethyl cellulose chain, but only when they are in an unneutralized form, i. e., deashed. This invention is directed particularly to the stabilization of deashed ethyl cellulose.

In the past, viscosity stabilization has been effected to some extent by the addition of copper salts, certain amines and certain phenolic bodies. In most cases these have tended to add color themselves or have contributed to the formation of color in the cellulose ether. In the few cases where color development has been less than that obtained where no stabilizers were used, the extent of color improvement has been insufficient and has been obtained largely under moderate, rather than high, heat conditions.

Some attempts have been made to improve color by treatment with bleaching agents and by treatment with acids. Where such improvements in color have been retained in the molding operation, they have resulted in such extreme loss of viscosity that a relatively useless molded product results. Even mildly bleaching, slightly acidic agents, such as sulfur dioxide, have been found to cause crazing, scorched dark spots, brittleness, i. e., local or general degradation at molding temperatures of 200° C., and above, either immediately or on normal aging. As a result, it has not been possible to prepare clear, colorless, molded ethyl cellulose articles or even to prepare molded ethyl cellulose articles in pale or pastel shades. Ethyl cellulose molded articles have, therefore, been made only in pigmented or dark colors.

It is the object of this invention to provide novel thermoplastic cellulose ether compositions of improved stability.

In accordance with this invention it has been found that thermoplastic cellulose ethers and their compositions can be effectively stabilized against viscosity degradation and discoloration by adding to or otherwise incorporating with the cellulose ether a small amount of certain phenolic stabilizers differing in structure from the phenolic stabilizers of the prior art. The phenols that are employed in this invention are of the polycyclic type having at least two noncondensed aromatic nuclei, said nuclei being joined by methylene groups and each of said nuclei having a hydroxy group in an ortho position or adjacent to the carbon atom attached to said methylene group.

The phenolic type stabilizers employed heretofore are either of the alkylated monocyclic type or of the noncondensed polycyclic type having the hydroxy group in a para position to the carbon atom attached to the methylene group that joins the cyclic nuclei. The phenolic stabilizers of this invention, when compared with the prior art stabilizers, provide a marked improvement in the stability of the thermoplastic cellulose ether compositions. This fact is demonstrated by the following examples. In these examples ethyl cellulose was stabilized with varying amounts of different phenolic stabilizers, and the stabilized ethyl cellulose compositions were then examined by a testing procedure and apparatus described by L. F. McBurney (Industrial and Engineering Chemistry 41, 1251 (1949)). The oxidation rates or oxygen absorption rates, which are indicative of the rate of oxidative degradation of the ethyl cellulose, were measured at 150° C. and at a constant partial pressure of oxygen of 307 mm. mercury, the difference between this and atmospheric pressure being made up by nitrogen. Figs. 1, 2, 3 and 4 demonstrate the oxidation rates observed in the specific examples set forth in detail below.

Some of the ethyl cellulose compositions were prepared by neutralizing a solution of 60 parts of ethyl cellulose, 380 parts of ethanol and 160 parts of benzene to a pH not greater than 4 with 2 N hydrochloric acid. The solution was emulsified by stirring in distilled water slowly until a slight cloudiness persisted, and precipitated by pouring slowly into an excess of vigorously stirred distilled water held at a temperature of 70°–75° C. The precipitated deashed ethyl cellulose was washed four times, batchwise, with distilled water. While stirring in the fourth wash water a quantity of ethanol, acetone or acetone-ethanol containing the stabilizer in a dissolved state was added to the slurry dropwise in sufficient quantity to provide the desired concentration of stabilizer, base on the ethyl cellulose. The stabilized sample was then dried at 70° C. in vacuo and its oxidation rate was measured as described above. The method of preparation is designated as Method A. For Method B the above procedure was duplicated except that the slurry constituting the fourth wash was heated to 90° C. before addition of the stabilizer. For Method C, Method A was duplicated except that the stabilizer was incorporated into the original benzene-ethanol solution before neutralization instead of being added to the fourth wash slurry.

*Example 1*

A series of runs was made and the observed data were employed in preparing the curves shown on accompanying Fig. 1. Pertinent information for these curves is tabulated as follows:

| Curve | Stabilizer | Percent stabilizer based on ethyl cellulose | Method of preparation |
|---|---|---|---|
| 1 | Diamylphenol | 1.0 | Method A. |
| 2 | Di(4-hydroxyphenyl)-dimethylmethane | 1.0 | Do. |
| 3 | 2,2'-methylene bis-p-cresol | 1.0 | Do. |
| 4 | 2,2'-methylene bis-6-tert-butyl-p-cresol | 1.0 | Method B. |
| 5 | 2,6-di(2-hydroxy-5-methyl phenyl methyl)-p-cresol | 1.0 | Do. |

A curve terminated with an arrowhead in this and the following examples indicates that the reaction at this point became too rapid to be followed under the conditions employed.

*Example 2*

Another series of runs was made and the observed data were employed in preparing the curves shown on accompanying Fig. 2.

| Curve | Stabilizer | Percent stabilizer based on ethyl cellulose | Method of preparation |
|---|---|---|---|
| 6 | Diamylphenol | 0.25 | Method C. |
| 7 | Octylphenol | 0.25 | Do. |
| 8 | 1,1-di(4-hydroxyphenyl) cyclohexane | 0.25 | Do. |
| 9 | 2,2'-methylene bis-p-cresol | 0.25 | Do. |
| 10 | 2,2'-methylene bis-4-isopropyl phenol | 0.25 | Do. |
| 11 | 2,6-di(2-hydroxy-5-methyl phenyl methyl-p-cresol | 0.25 | Do. |
| 12 | 2,6-di(2-hydroxy-5-isopropyl phenyl isopropyl)-p-cresol | 0.25 | Do. |
| 13 | 2,6-di(2-hydroxy-3-isobutyl-5-methyl phenyl methyl)-p-cresol | 0.25 | Do. |

*Example 3*

Another series of runs was made and the observed data were employed in preparing the curves shown on accompanying Fig. 3.

| Curve | Stabilizer | Percent stabilizer based on ethyl cellulose | Method of preparation |
|---|---|---|---|
| 14 | Diamylphenol | 1.0 | Method B. |
| 15 | Octylphenol | 1.0 | Do. |
| 16 | 1,1-di(4-hydroxyphenyl) cyclohexane | 1.0 | Do. |
| 17 | 2,2'-methylene bis-p-cresol | 1.0 | Do. |
| 18 | 2,2'-methylene bis-4-isopropyl phenol | 1.0 | Do. |
| 19 | 2,6-di(2-hydroxy-5-methyl phenyl methyl)-p-cresol | 0.5 | Do. |
| 20 | 2,6-di(2-hydroxy-3-isobutyl-5-methyl phenyl methyl)-p-cresol | 1.0 | Do. |

*Example 4*

Another series of runs was made and the observed data were employed in preparing the curves shown on accompanying Fig. 4.

| Curve | Stabilizer | Percent stabilizer based on ethyl cellulose | Method of preparation |
|---|---|---|---|
| 21 | Diamylphenol | 1.0 | Method A. |
| 22 | 2,2'-methylene-bis-6-tert-butyl-p-cresol | 0.25 | Method B. |
| 23 | 2,6-di(2-hydroxy-5-methyl phenyl methyl)-p-cresol | 0.1 | Method C. |
| 24 | 2,6-di(2-hydroxy-5-methyl phenyl methyl)-p-cresol | 0.3 | Do. |

The accompanying drawings demonstrate that the phenolic stabilizers within the scope of this invention, when incorporated in an ethyl cellulose composition, serve to introduce periods of induction or pronounced retardation in the oxidation of the ethyl cellulose although the stabilizers may be present in relatively small amounts. In contrast, the phenolic stabilizers of the prior art produce markedly less stability in the ethyl cellulose composition even at considerably higher stabilizer concentrations.

The method and compositions of this invention use cellulose ethers of the thermoplastic type and of sufficient degree of polymerization to yield tough, molded articles. In general, cellulose ethers soluble in any of the common organic solvents, such as acetone, benzene, toluene-alcohol, methanol, ethanol, ethyl acetate, butyl acetate, and the like, are of the required thermoplastic type. Ethyl cellulose having an ethoxyl content between about 37% and about 52%, preferably between about 43% and about 48% and having a viscosity of at least about 20 cps., is particularly suitable. However, thermoplastic propyl cellulose, ethyl propyl cellulose, ethyl butyl cellulose, methyl ethyl cellulose, and benzyl cellulose are likewise useful in molding compositions, and by proceeding in accordance with this invention viscosity loss and consequent embrittlement of products formed from their molding compositions are prevented. This invention is particularly applicable to the deashed form of ethyl cellulose as well as the other cellulose ethers named above, in spite of the fact that deashing increases the susceptibility of these cellulose ethers to oxidation and its accompanying degradation. The phenolic stabilizers of this invention check the oxidative degradation of even such sensitive cellulose ethers. Deashed ethyl cellulose can be prepared by converting the carboxyl groups in the ethyl cellulose to the free acid form, for example, by adjusting the pH of a solution of the ethyl cellulose to a pH not greater than 4.

The stabilizers of this invention are polycyclic phenols having at least two noncondensed aromatic nuclei, said nuclei being joined by methylene groups and each of said nuclei having a hydroxy group ortho or adjacent to the carbon atom attached to said methylene groups. The following structural formulas represent examples of these stabilizers:

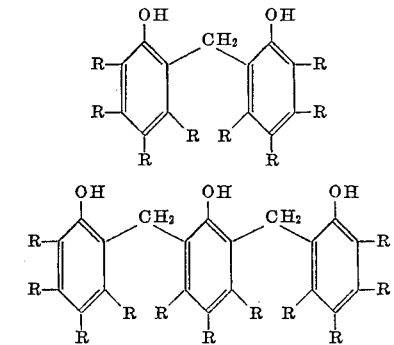

In these structural formulas each R represents a hydrogen atom or an alkyl radical, for example, methyl, ethyl, propyl, isopropyl, butyl, sec-butyl, tert-buty, amyl, and the like. In these structural formulas the R groups or radicals may be the same or different. For example, some of the stabilizers are represented by the formula

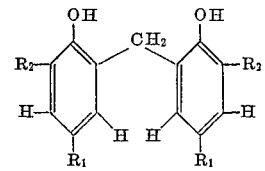

and by the formula

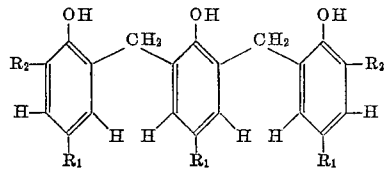

wherein $R_1$ and $R_2$ can be hydrogen or an alkyl radical, such as methyl, isopropyl, tert-butyl, and the like. The above specific examples set forth particular phenolic stabilizers within the scope of this invention.

The stabilizers according to the present invention may be incorporated before, during or after preparation of the cellulose ether compositions or while the cellulose ether compositions are being molded or otherwise formed into finished plastic articles. Alternatively, the cellulose ether may be suspended in water or a swelling medium, such as aqueous alcohol and a solution of the stabilizer added to the suspension for absorption by the cellulose ether. Incorporation of the stabilizer at some stage of manufacture is desirable, since it frequently happens that the cellulose ether is stored for considerable periods before use, and the presence of an effective stabilizer prevents any substantial degradation due to aging.

The stabilizer may also be incorporated during preparation of the product in which the cellulose ether is eventually employed. For example, in the preparation of cellulose ether lacquers, molding powders, etc., the stabilizer may be added to the finished lacquer or to the lacquer solvent during or prior to dissolving the other lacquer ingredients; to the mixture of ingredients prior to or during formation of a molding powder, etc.

In most instances at least 0.1% by weight of stabilizer based on the cellulose ether is required to produce the desired stabilization. The maximum amount of stabilizer that is used is limited by the ultimate application of the composition and economic factors. Usually no more than 5.0% by weight of stabilizer based on the cellulose ether is used. The preferred range is from 0.25% to 1% by weight of the cellulose ether.

It will be understood that plasticizers, such as dibutyl phthalate, diethyl phthalate, butyl stearate, triphenyl phosphate, tricresyl phosphate, raw castor oil, nonvolatile mineral oils, methyl phthalyl ethyl glycolate, hydrogenated methyl abietate, and the like, may be incorporated with the cellulose ether as usual in the preparation of plastic masses. Likewise, resins, such as the oil-soluble phenol aldehyde condensates, ester gum, hydrogenated glycerol abietate, pentaerythritol abietate, rosin, and oil-modified alkyd resins, would also be included although, as a rule, these substances are not used extensively in plastics intended for molding. Similarly, waxes, such as paraffin, microcrystalline petroleum waxes, carnauba wax, candelilla wax, montan wax, and Japan wax, may also be included. Pigments, dyes, and filters may also be included.

The stabilized compositions of this invention can be shaped with the aid of heat by any mechanical modification. Thus, shaping may be by compression molding under heat, injection molding, or by extrusion, drawing, and the like. Temperatures may vary from 100° C. to 300° C. The invention is particularly valuable in permitting molding at the relatively high but efficient and frequently necessary temperatures of the order of 190°–250° C.

It will be appreciated that the compositions in accordance with this invention are also useful where heat is not essential for shaping but where a composition is subjected to relatively high temperatures or to moderately high temperatures for long periods of time. Thus, the compositions retain good color and stability over long periods of exposure to heat and light in the form of lacquer films, electrical insulation, impregnated and coated fabric, and in film or sheeting.

It has been found that the compositions in accordance with this invention can be molded at quite high temperatures without encountering degradation as normally encountered with cellulose ethers. The compositions of this invention are stabilized against degradation in the form of severe viscosity drop. Stability of this nature preserves toughness.

From the above disclosure various modifications within the scope of the invention will be apparent to those skilled in the art.

What I claim and desire to protect by Letters Patent is:

1. A stabilized cellulose ether composition comprising a thermoplastic cellulose ether and from 0.1% to 5% by weight of a polycyclic phenol having 2 to 3 monocyclic phenyl nuclei, said nuclei being joined by methylene groups and each of said nuclei having a hydroxy group in a position adjacent to the carbon atom attached to said methylene group and substituents in the remaining positions selected from the group consisting of hydrogen atoms and alkyl radicals having 1 to 5 carbon atoms.

2. A stabilized cellulose ether composition comprising a thermoplastic ethyl cellulose and from 0.1% to 5% by weight of a polycyclic phenol having 2 to 3 monocyclic phenyl nuclei, said nuclei being joined by methylene groups and each of said nuclei having a hydroxy group in a position adjacent to the carbon atom attached to said methylene group and substituents in the remaining positions selected from the group consisting of hydrogen atoms and alkyl radicals having 1 to 5 carbon atoms.

3. A stabilized cellulose ether composition comprising a deashed thermoplastic ethyl cellulose and from 0.1% to 5% by weight of a polycyclic phenol having 2 to 3 monocyclic phenyl nuclei, said nuclei being joined by methylene groups and each of said nuclei having a hydroxy group in a position adjacent to the carbon atom attached to said methylene group and substituents in the remaining positions selected from the group consisting of hydrogen atoms and alkyl radicals having 1 to 5 carbon atoms.

4. A stabilized cellulose ether composition comprising a deashed thermoplastic ethyl cellulose and from 0.1% to 5% by weight of 2,2'-methylene bis-p-cresol.

5. A stabilized cellulose ether composition comprising a deashed thermoplastic ethyl cellulose and from 0.1% to 5% by weight of 2,2'-methylene bis-4-isopropyl phenol.

6. A stabilized cellulose ether composition comprising a deashed thermoplastic ethyl cellulose and from 0.1% to 5% by weight of 2,2'-methylene bis-6-tert-butyl-p-cresol.

7. A stabilized cellulose ether composition comprising a deashed thermoplastic ethyl cellulose and from 0.1% to 5% by weight of 2,6-di(2-hydroxy-5-methyl phenylmethyl)-p-cresol.

8. A stabilized cellulose ether composition comprising a deashed thermoplastic ethyl cellulose and from 0.1% to 5% by weight of 2,6-di(2-hydroxy-5-isopropyl phenyl-isopropyl)-p-cresol.

References Cited in the file of this patent

UNITED STATES PATENTS

| | | |
|---|---|---|
| 2,075,144 | Schneider | Mar. 30, 1937 |
| 2,333,577 | Koch | Nov. 2, 1943 |
| 2,389,370 | Koch | Nov. 20, 1945 |

OTHER REFERENCES

Marsh et al, "Ind. and Eng. Chem." 38, (1946), pp. 701–705.

Morawetz, "Ind. and Eng. Chem.," 41, 1442–1447 (1949).

Berry et al., Ethyl Cellulose Compositions "Factors Affecting Outdoor Durability," Table III, Hercules Powder Co., Wilmington, Del.